United States Patent [19]
Okuyama et al.

[11] Patent Number: 5,346,431
[45] Date of Patent: Sep. 13, 1994

[54] SEALING COVER FOR COUPLING

[75] Inventors: Koshi Okuyama; Masahiro Shiraishi, both of Shizuoka; Takashi Miyazaki, Kanagawa, all of Japan

[73] Assignee: NOK Corporation, Tokyo, Japan

[21] Appl. No.: 22,601

[22] Filed: Feb. 17, 1993

Related U.S. Application Data

[63] Continuation of Ser. No. 614,633, Nov. 16, 1990, abandoned.

[30] Foreign Application Priority Data

Nov. 27, 1989 [JP] Japan .............. 1-137049[U]
Jan. 9, 1990 [JP] Japan .............. 2-358[U]
Jan. 12, 1990 [JP] Japan .............. 2-1216[U]

[51] Int. Cl.$^5$ .................................. F16D 3/84
[52] U.S. Cl. ........................ 464/171; 464/173
[58] Field of Search ............... 464/7, 17, 170, 171, 464/173; 277/212 FB, 212 R; 405/50

[56] References Cited

U.S. PATENT DOCUMENTS

| | | | |
|---|---|---|---|
| 3,075,370 | 1/1963 | Kings | 464/171 |
| 3,260,071 | 7/1966 | Westercamp | 464/171 |
| 3,362,192 | 1/1968 | Orain | 464/906 X |
| 3,418,828 | 12/1968 | Carns | 464/171 |
| 3,842,621 | 10/1974 | Mazziotti | 464/171 |
| 4,231,673 | 11/1980 | Satoh et al. | 403/125 |
| 4,238,936 | 12/1980 | Devos | 464/171 X |
| 4,240,680 | 12/1980 | Krude et al. | 464/173 X |
| 4,385,677 | 5/1983 | Sowers | 464/171 X |
| 4,597,745 | 7/1986 | Orian | 464/173 |
| 4,627,826 | 12/1986 | Juziuk et al. | 464/171 |
| 4,664,393 | 5/1987 | Hazebrook | 464/173 X |
| 4,852,891 | 8/1989 | Sugiura et al. | 277/212 FB X |
| 5,007,881 | 4/1991 | Hazebrook | 464/171 |

FOREIGN PATENT DOCUMENTS 56-47409 10/1981 Japan .
896120 5/1962 United Kingdom .............. 464/171

*Primary Examiner*—Daniel P. Stodola
*Assistant Examiner*—Eileen A. Dunn
*Attorney, Agent, or Firm*—Jacobson, Price, Holman & Stern

[57] ABSTRACT

A sealing cover fitted on a coupling which connects an input shaft (1) and an output shaft (2) to each other for relative movement as in a U-joint including an outer member (3) having an outer spherical surface (3a) and connected to one of said shafts (2), comprises a first spherical shell (4) having an outer part made partly of a low flexibility material and having an inside part spherical surface slidably fitted on the outer spherical surface (3a), and a part spherical channel (7) open at the end of the shell near the other of the shafts (1), a second part spherical shell (8) slidably inserted at one end thereof into the channel (7) and fitted at the other end thereof on the shaft (1), a first sealing portion provided near one end of the first shell (4) in contact with the outer surface (3a) of the outer member (3), and a second sealing portion (10) provided near the other end of the first shell in contact with the outer part spherical surface (8c) of the second shell (8).

20 Claims, 8 Drawing Sheets

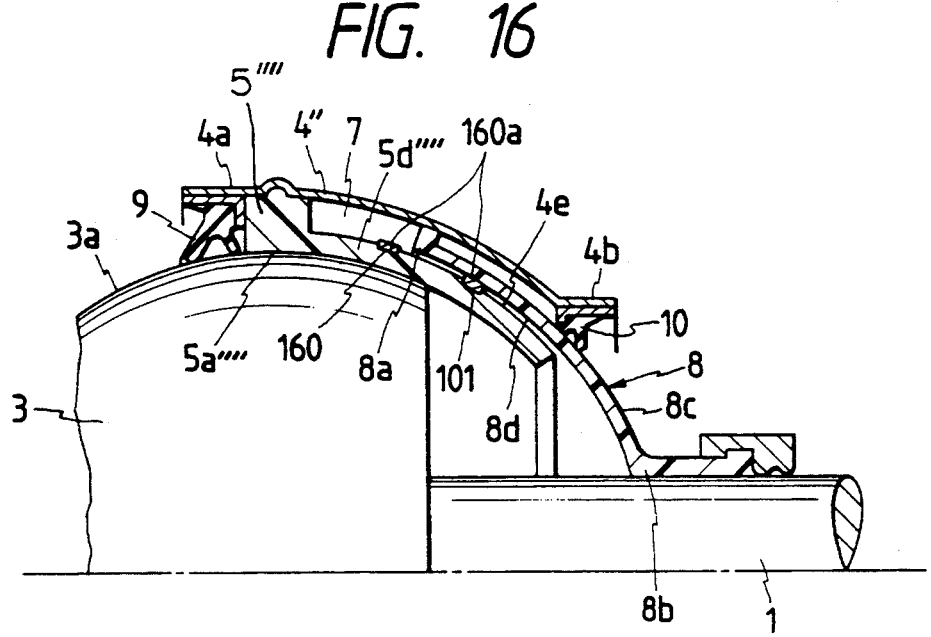
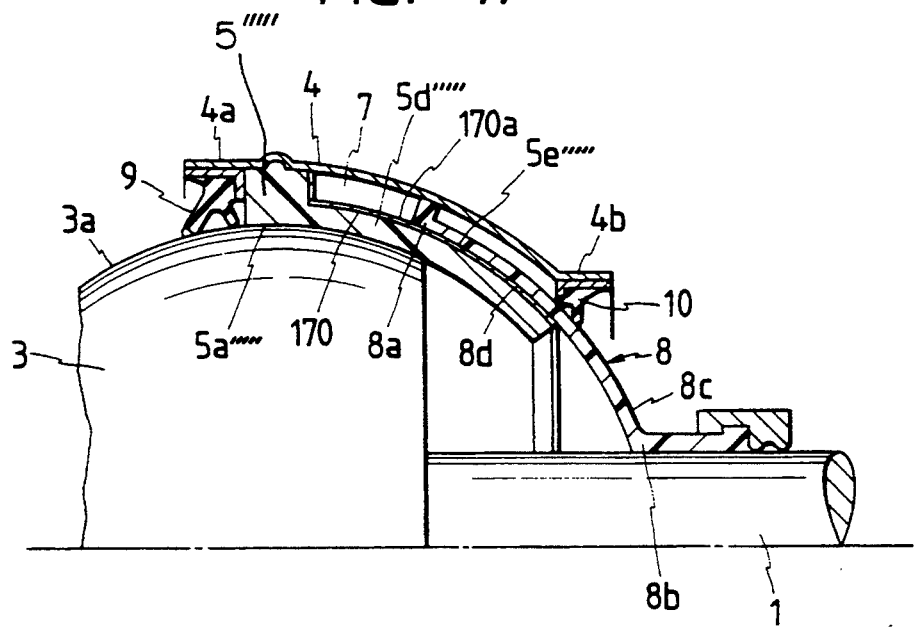

SEALING COVER FOR COUPLING

This is a continuation of application Ser. No. 07/614,633, filed Nov. 16, 1990 which was abandoned upon the filing hereof.

BACKGROUND OF THE INVENTION

The present invention relates to an improved sealing cover for a coupling.

A conventional armadillo-like sealing cover having a plurality of spherical shells was disclosed in the Japanese Patent Application (OPI) No. 200024/87 (the term "OPI" as used herein means an "unexamined published application"). However, the conventional sealing cover has problems that the sealing property thereof is not high enough to prevent external muddy water or dust from entering into the cover, and the cover does not have a positive means for sufficient lubrication of the sliding portions of the cover. In addition, the cover has a problem that since the spherical shells are less flexible, smooth sliding is less likely to be obtained when two shafts become eccentric except where the shafts perform a predetermined joint-like swing relative to each other.

BRIEF SUMMARY OF THE INVENTION

The present invention was made in order to solve the above-mentioned problems.

It is an object of the invention to provide a sealing cover fitted on a coupling which connects an input and an output shaft to each other to make it possible to move the shafts relatively to each other as in a bone joint or universal joint and includes an outer member having an outside spherical surface and connected to one of the shafts. The sealing cover comprises a first part spherical shell having an outer part made of a low flexibility material and having an inside spherical surface slidably fitted on the outside spherical surface of the outer member, and a part spherical groove, opening or channel open at the end of the shell near the other of the shafts; a second part spherical shell slidably inserted at one end thereof into the part spherical channel and fitted at the other end thereof on the latter shaft; a first sealing portion provided near one end of the first part spherical shell and located in contact with the outside part spherical surface of the outer member; and a second sealing portion provided near the other end of the first shell and 8 located in contact with the outside part spherical surface of the second shell. The first and second sealing portions are provided at the ends of the first shell, which is the outermost part of the sealing cover, to enhance the sealing property of the cover. It is convenient that the first shell having the part spherical channel is made of inner and outer portions between which the channel is located. The inner and outer portions of the first shell and the first and second sealing portions may be separately manufactured parts assembled with each other. The first and second sealing portions may be integrally formed on the inner portion of the first shell. To increase the volume inside the first shell, the portion of the shell, which is located outside the channel thereof in the radial direction of the sealing cover, may be partly expanded so that one end portion of the second shell slides on the outside surface of the other portion of the first shell, which is located inside the channel thereof in the radial direction of the cover.

When the sealing cover is applied to the members of the coupling of the driving system of a motor vehicle, the plural spherical shells of the cover are gradually operated according as the angle between the axes of the members of the coupling increases to about 45 degrees, whereby problems might occur with regard to the sealing property, lubricating property and eccentricity coping property of the sealing cover. However, any such problems are solved by the invention.

To enhance the lubricating property of the sealing cover, at least part of at least one of the sliding surfaces of the cover and the outer member of the coupling may be provided with recesses to make it more likely for the surface to hold a lubricant. The recesses provided in the inside surface of the first shell may be a large number of radially extending grooves. The recesses provided in the outside surface of the outer member may be made due to the roughness of the surface. The recesses provided in the outside surface of the portion of the first shell, which is located inside the channel thereof in the radial direction of the sealing cover, may be labyrinth-like recesses. The recesses may thus be provided to produce a sufficient lubrication effect. To otherwise enhance the lubricating property of the sealing cover, at least one sliding part is rounded at the edge thereof to prevent the scraper phenomenon of the edge to make it more likely for the lubricant to be introduced in between the sliding parts. To yet otherwise enhance the lubricating property of the sealing cover, the portion of the first shell, which is located inside the channel thereof in the radial direction of the cover, may be provided with a desired number of holes for supplying the lubricant to the portion and the sliding portion of the second shell on the former portion by the centrifugal force at the time of rotation of the cover. To yet otherwise enhance the lubricating property of the sealing cover, the end face of the portion of the first shell, which is located inside the channel thereof in the radial direction of the cover, may be cut to obliquely extend to diverge from the inside of the portion toward the outside thereof to supply the lubricant to the sliding parts of the cover by the centrifugal force at the time of rotation thereof. Although each of these lubricating property enhancement means is effective by itself, they may be combined with each other to be more effective.

The second part spherical shell is slidably inserted at one end thereof into the part spherical channel of the first shell so that the inside part spherical surface of the second shell slides on the outside part spherical surface of the first shell. Since the sliding is likely to be performed deep in the spherical groove, it could occur that the lubricant sealed inside the sealing cover is not sufficiently supplied for the sliding and the sliding parts of the shells are therefore worn and damaged. To reduce or prevent the wear of the sliding parts, grooves or recesses for holding the lubricant may be provided or sliding members having part spherical sliding surfaces and low coefficient of friction may be provided. The lubricating property of the sealing cover can thus be yet otherwise enhanced.

To enhance the sealing property of the sealing cover, the first and the second sealing portions may be constituted by lip seals of high sealing property and fitted with scrapers on the fronts of the lips of the seals so as to scrape down clinging extraneous substances from the outer member. Filters made of a non-woven fabric may be attached to the fronts of the scrapers to collect small extraneous substances on the filters. To otherwise enhance the sealing property of the sealing cover, the end portion of the second shell, which is fitted on the shaft, may be provided with a lip seal of high sealing property. To yet otherwise enhance the sealing property of the sealing cover, a slinger may be provided at the end of the first shell so that muddy water gathering to the end or like part is slung away.

The first and second shells of a conventional sealing cover are fitted at the ends of the shells on an input shaft so that the shells cannot move relative to the input shaft. The input and output shafts are likely to have a clearance between them in the axial direction thereof, or play in that direction, so that the shells are moved together with the input shaft to increase the resistance to the sliding of the sliding parts or sealing parts of the sealing cover to cause heating and wearing. To solve this problem, the first or second shell of the sealing cover provided in accordance with the present invention may be slidably fitted on one of the input and output shafts by a fitting member made of a rubber-like elastic material and having a bellows-like portion.

To enhance the eccentricity coping property of the sealing cover, the second shell may be provided with an easily-deformable annular thin part near the end of the shell. To otherwise enhance the eccentricity coping property of the sealing cover, the second shall may be provided with an annular bent part at the end of the shell and with ribs for reinforcing the part.

Each of the particular means mentioned above may be applied to a conventional armadillo-like sealing cover to produce a particularly good effect.

The inside part spherical surface of the first shell of a conventional sealing cover is set at the same curvature as the outside part spherical surface of the outer member of a coupling and slides on the latter surface. For that reason, when the sliding part or first shell of the sealing cover is thermally expanded because of heating due to the sliding, the thermal expansion is likely to fail to be absorbed by the cover, to increase the contact pressure on the sliding part or first shell thereof to cause a problem such as the impossibility of the smooth sliding thereof. To solve the problem, the sliding part or first shell of the sealing cover in accordance with the present invention may be provided with a recess for absorbing the thermal expansion of the sliding part of the first shell. The recess is an annular or non-annular groove, a notch, a slot or the like.

DESCRIPTION OF THE DRAWINGS

The invention will now be described in detail with reference to the accompanying drawings wherein:

FIGS. 16 and 17 are partial cross-sectional views of sealing covers of further embodiments of the present invention;

DETAILED DESCRIPTION OF EXEMPLARY EMBODIMENTS

Embodiments of the present invention are hereafter described in detail with reference to the drawings wherein 1, 2 and 3 are an input shaft, an output shaft and an outer member, respectively. The outer member 3 is included in an equal-speed coupling and is connected to the output shaft 2, and has an outside part spherical surface (i.e. segment of a spherical surface) 3a. The input and the output shafts 1 and 2 are connected to each other by the coupling.

Figure 1:
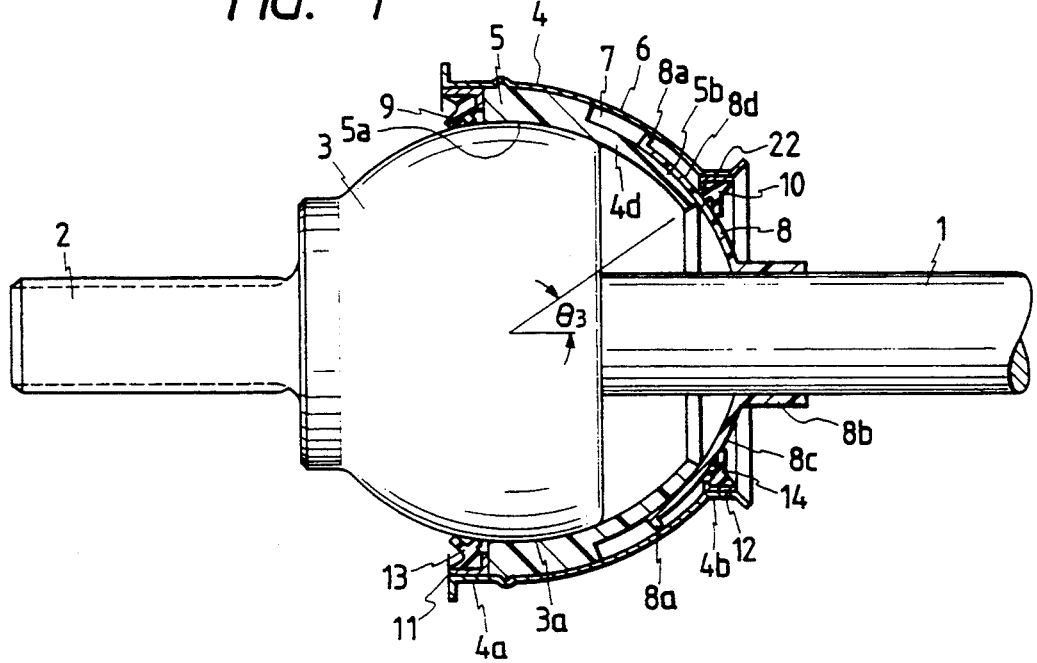
FIG. 1 is a cross-sectional view of a sealing cover in accordance with one embodiment of the present invention.

FIG. 1 shows a sealing cover of one of the embodiments having an inside part spherical surface (i.e. segment of a spherical surface) 5a slidably fitted on the outside part spherical surface 3a of the outer member 3 of the coupling. The sealing cover includes a first part spherical shell 4, a second part spherical shell 8, a first sealing portion 9, and a second sealing portion 10. The first part spherical shell 4 is made of a less flexible material, and has a part spherical groove, opening or channel 7 open at the end of the cover near the input shaft 1. The second part spherical shell 8 is made of a less flexible material, slidably fitted at one end thereof on which a sealing rib 8a is provided in the part spherical groove 7 of the first part spherical shell 4, and mounted at the other end 8b thereof on the input shaft 1. For brevity, the part spherical shells and surfaces will be hereafter referred to as spherical. The first sealing portion 9 is provided near the end 4a of the first spherical shell 4, and located in contact with the outside spherical surface 3a of the outer member 3. The second sealing portion 10 is provided near the other end 4b of the first spherical shell 4, and located in contact with the outside spherical surface 8c of the second spherical shell 8. The first spherical shell 4 includes an inner portion 5 and an outer spherical portion 6 between which the port spherical channel 7 is located. The inner portion 5, the outer spherical portion 6, the second spherical shell 8, the first sealing portion 9 and the second sealing portion 10, which are separately manufactured elements, are hermetically assembled with each other to constitute the sealing cover to seal a lubricant inside it. The outer spherical portion 6, which is the outermost part of the sealing cover, is made of a less flexible material such as various kinds of metal and resin. The inner portion 5 and the second spherical shell 8 are made of a less flexible material such as various kinds of highly wear-resisting resin including polyester resin. The first and the second sealing portions 9 and 10 are made of lips 13 and 14 of urethane rubber, nitrile rubber or the like and fitted rings 11 and 12 fitted on the outer spherical portion 6, respectively. The lips 13 and 14 are stuck to the fitted rings 11 and 12 by heating.

Figure 2:
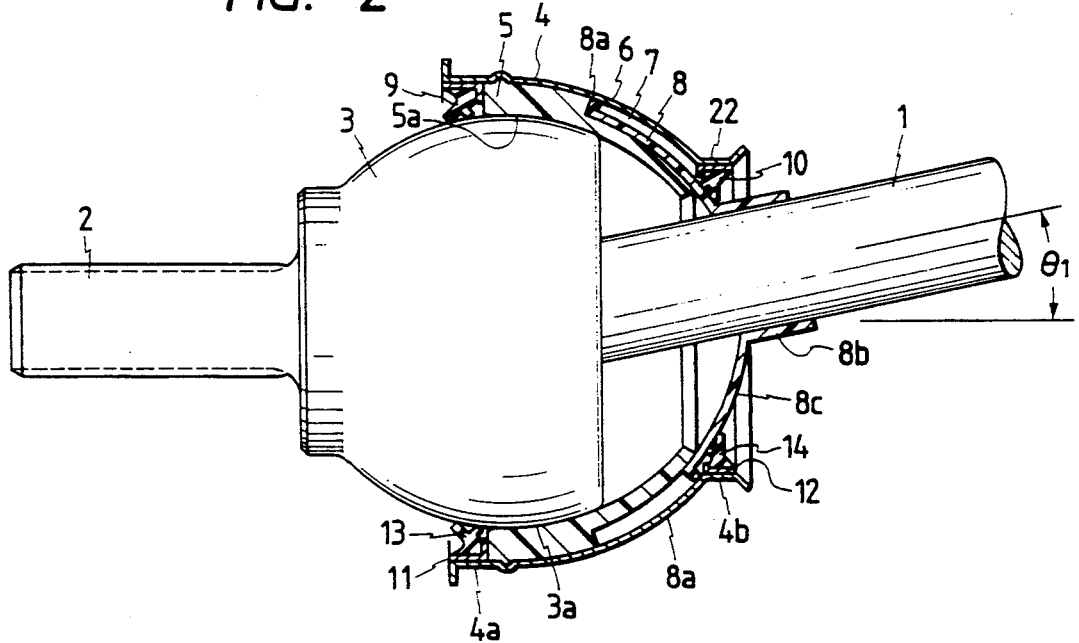
FIGS. 2 and 3 are views similar to FIG. 1 of the sealing cover in various states of operation.
Figure 3:
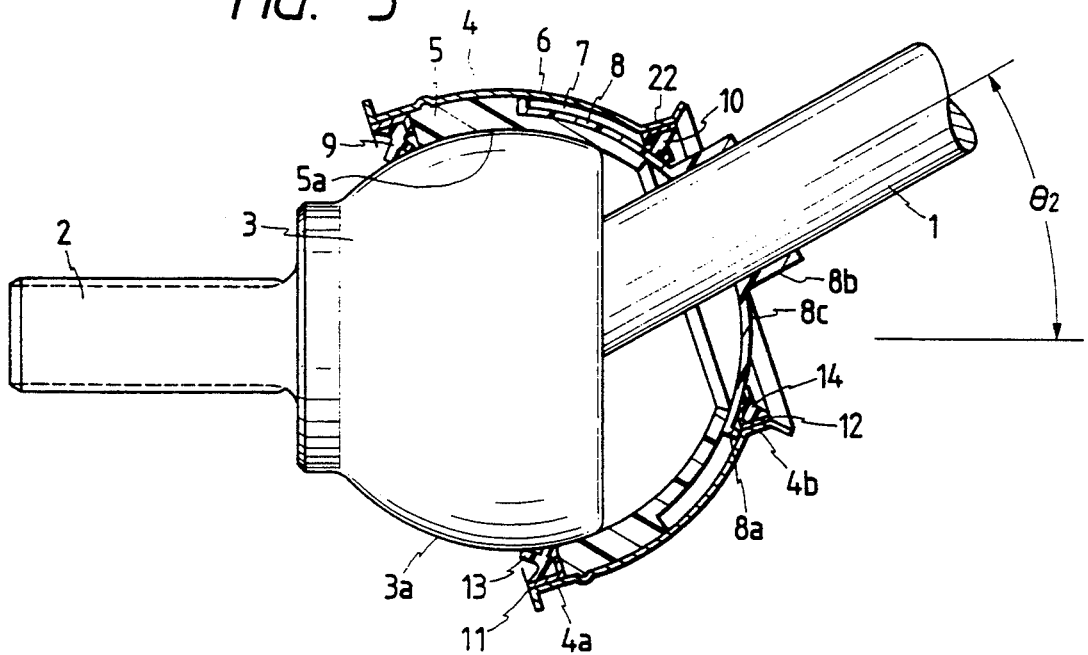

As shown in FIGS. 2 and 3, the sealing cover is gradually moved together with the input shaft 1 according as the input shaft and the output shaft 2 swing relative to each other during their rotation. Since the exclusive sealing portions 9 and 10 are provided at both ends of the outer spherical portion 6 which is the outermost part of the sealing cover, the cover has a high sealing property.

Figure 4:
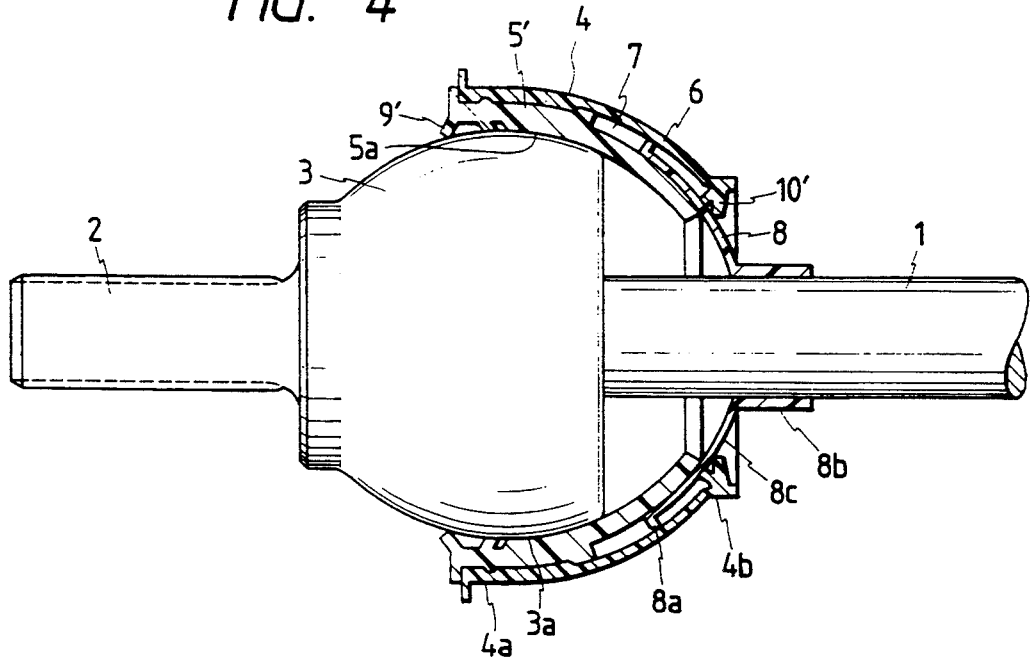
FIGS. 4 and 5 are views similar to FIG. 1 of other embodiments of the present invention.

FIG. 4 shows a sealing cover of another embodiment. The difference of this sealing cover embodiment from that shown in FIGS. 1, 2 and 3 is that the inner portion 5' and outer spherical portion 6 of the first spherical shell 4 of the cover shown in FIG. 4 and the first and second sealing portions 9' and 10' thereof are made of a less flexible material such as a hard resin and a hard urethane rubber, the inner portion 5' and the first sealing portion 9' are integrally formed with each other, and the outer spherical portion 6 and the second sealing portion 10' are integrally formed with each other. For that reason, the manufacturing of the sealing cover shown in FIG. 4 and the cost thereof are easier and lower than those of the preceding sealing cover, respectively. The first and second sealing portions 9' and 10' of the sealing cover shown in FIG. 4 are made of lip seals.

Figure 5:
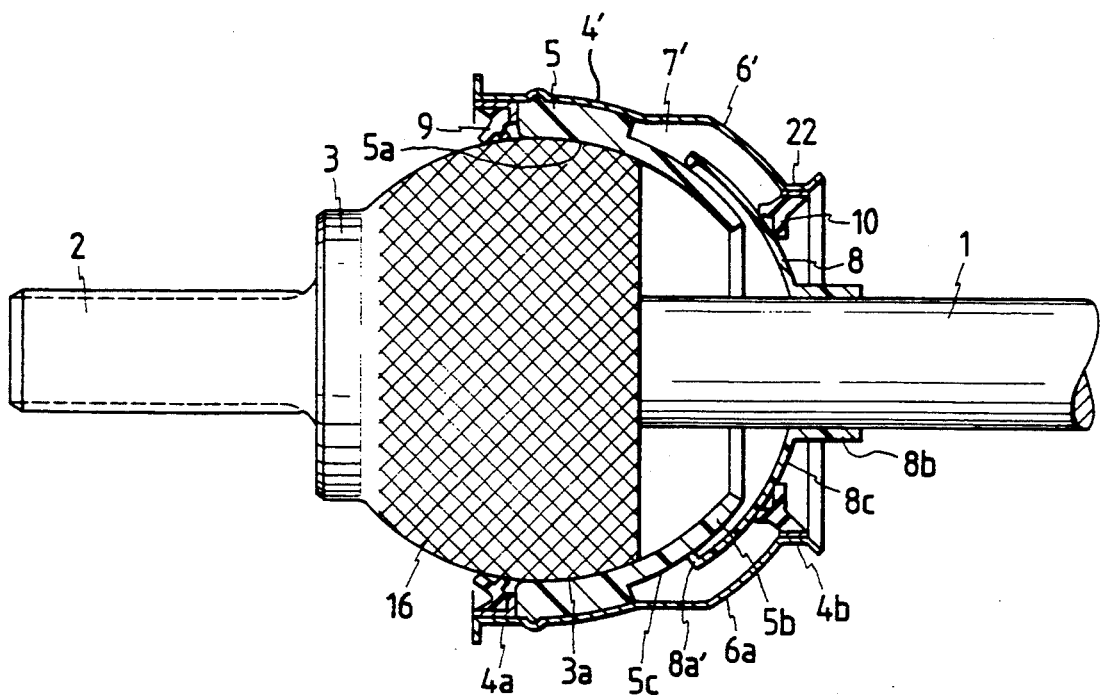

FIG. 5 shows a sealing cover which is yet another of the embodiments. The difference of the sealing cover from those shown in FIGS. 1, 2, 3 and 4 is that the spherical portion 6' of the first spherical shell 4' of the sealing cover, which is located outside the spherical channel 7' of the shell in the radial direction of the cover, has an outer part 6a expanded outward in the radial direction so as to be larger in diameter than the other part of the portion. Thus, the volume inside the spherical portion 6' is increased without expanding the whole shell 4', so that a larger amount of the lubricant can be sealed inside the cover. One end portion 8a' of the second spherical shell 8' of the sealing cover slides on the outside spherical surface 5c of the inner part 5b of the inner portion 5 of the first spherical shell 4' thereof. The inner part 5b is located inside the spherical channel 7' of the first spherical shell 4'.

Figure 6:
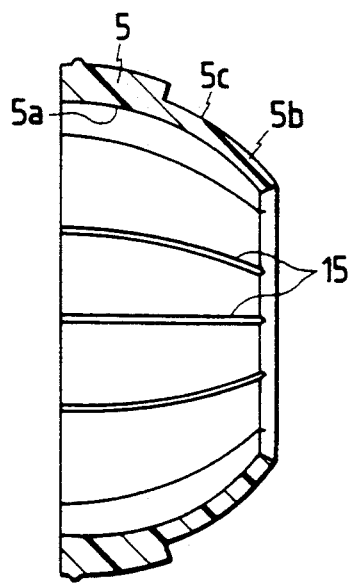
FIGS. 6 and 7 are cross-sectional views of the inner portions of sealing covers of yet other embodiments of the present invention.
Figure 7:
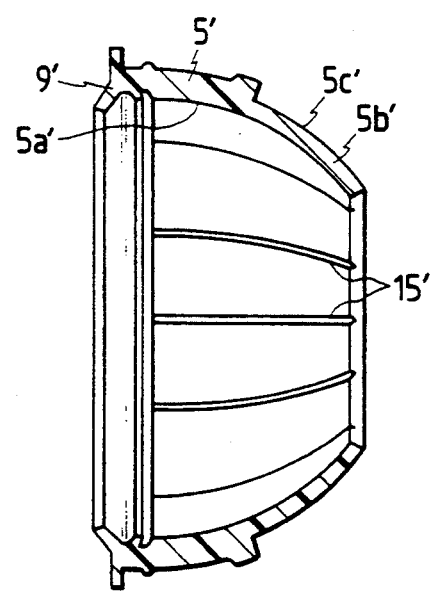

As for the sealing covers, at least part of each of the inside and outside spherical surfaces 5a and 5c of the inner portion 5, which is a sliding portion, and at least part of the outside spherical surface 3a of the outer member 3 of the coupling may be provided with thin recesses for holding the lubricant to reduce the frictional resistance to the sliding parts of the inner portion and the outer member to enhance the lubrication of the sliding parts. The form and size of the thin recesses are not limited in particular. It is preferable that the thin recesses of the inside spherical surface 5a of the inner portion 5 are constituted by a large number of axially extending grooves, 15' as shown in FIGS. 6 or 7, the thin recesses of the outside spherical surface 3a of the outer member 3 are made due to the roughness 16, preferably large surface roughness, of the surface as shown in FIG. 5, and the thin recesses of the outside spherical surface 5c of the inner portion 5 are constituted by thin labyrinth-like grooves.

As for the sealing covers, the inner portion 5, the second spherical shell 8 and the outer member 3 may be rounded at the sliding edges of the inside and outside surfaces 5a and 5c of the inner portion, the sliding edge of the second spherical shell and the sliding edge of the outside spherical surface 3a of the outer member along the total circumferences of them so as to prevent the scraper phenomenon of the edges to enhance the lubrication of the inner portion, the shell and the outer member. The radius of the curvature of the rounding is not limited in particular.

Figure 14:
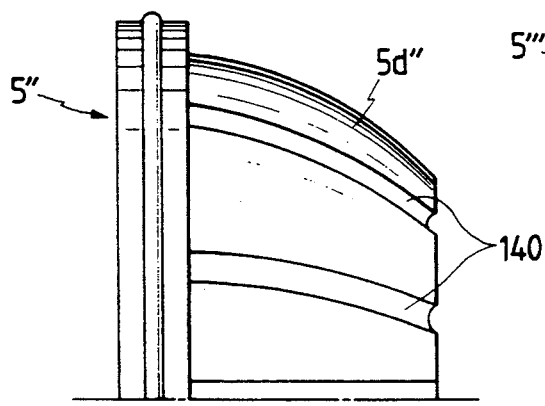
FIGS. 14 and 15 are partial elevational views of inner portions of sealing covers which are yet other embodiments of the present invention.

FIG. 14 shows the inner portions 5'' of a sealing cover which is yet another of the embodiments. The difference from those shown in FIGS. 1, 2, 3 and 4 is that the portion 5d'' which is located inside the channel 7 in the radial direction of the cover, has a desired number of grooves 140 for holding the lubricant to positively lubricate the sliding parts of the cover to reduce the resistance to the sliding of the parts to prevent them from being worn.

Figure 15:
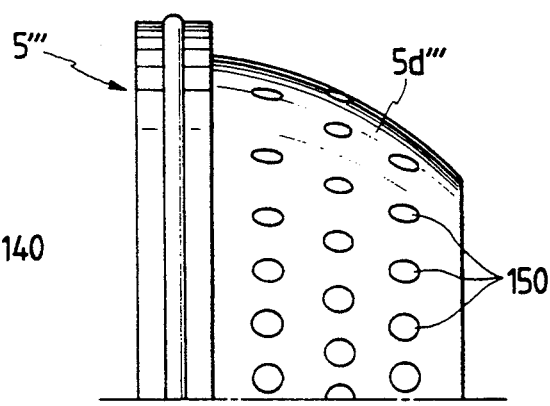

FIG. 15 shows an embodiment of inner portion 5''' having dimples 150 rather than grooves 140 for holding lubricant for the same purpose as the FIG. 14 embodiment.

FIG. 16 shows the first spherical shell of a sealing cover which is yet another of the embodiments. The difference of the sealing cover from those shown in other figures is that the portion 5d'''' of inner portion 5'''', which is located inside the channel 7 in the radial direction of the cover, is fitted with a desired number of sliding rings 160 which are made of a material having lower frictional properties than polyurethane rubber and have spherical sliding surfaces 160a, to reduce the resistance to the sliding of the sliding parts of the cover to prevent the parts from being worn. The sliding rings 160 are fitted in the grooves 101 portion of 5d'''' so that it is separated from the second spherical shell 8 of the sealing cover.

FIG. 17 shows the first spherical shell of a sealing cover which is yet another of the embodiments. The difference from those shown in other figures is that the portion 5d''''' of inner portion 5''''' is fitted with a sliding sheet 170 made of the same material as the sliding rings 160 and has a spherical peripheral sliding surface 170a, to reduce the resistance to the sliding of the sliding parts of the cover to prevent the parts from being worn. The thickness of the sliding sheet 170 depends on the size of the sealing cover, but is preferably 0.15 mm to 0.5 mm.

Figure 12:
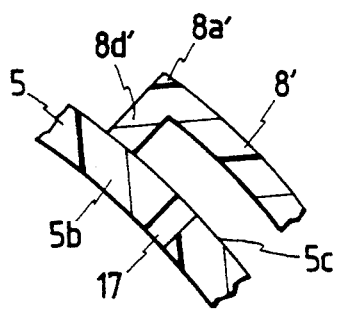
Figure 13:
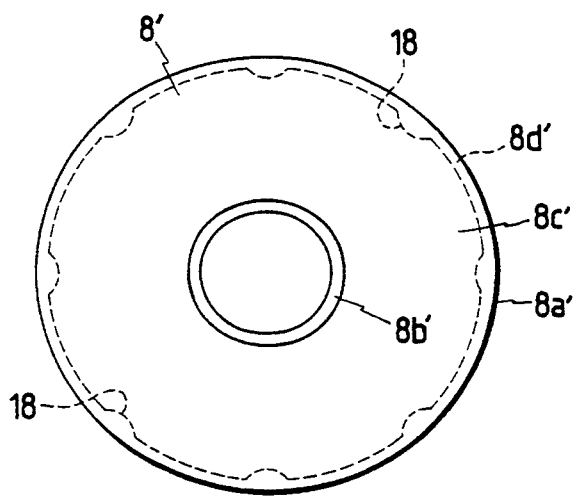
FIG. 13 is a front view of the second spherical shell of a sealing cover of yet another embodiment of the present invention.

As shown in FIG. 12, the part 5b of the inner portion 5, which is located inside the channel 7 in the radial direction of the sealing cover shown in FIG. 5, may have a desired number of holes 17 for supplying the lubricant to the sliding surfaces of the part 5b and the second spherical shell 8' by the centrifugal force at the time of rotation of the sealing cover so as to enhance the lubrication of the sliding surfaces. In that case, as shown in FIG. 13, the bent portion 8d' of the second spherical shell 8' at one end 8a' thereof may be provided with a number of inward projections 18 to set an appropriate clearance to more enhance the lubrication.

The end face of the part 5b of the inner portion 5, which is located inside the channel 7 in the radial direction of each of the sealing covers, may be cut to obliquely extend at a prescribed angle $\Theta 3$ (FIG. 1) to diverge from the inside of the part toward the outside thereof to better supply the lubricant by the centrifugal force at the time of rotation of the cover to enhance the lubrication of the sliding parts of the cover.

The lip seals for the first and the second sealing portions 9 and 10 have a pressure self-increasing property, and function to cope well with eccentricity. The portions 9 and 10 are made of the lip seals to utilize these features to the utmost.

Figure 8:
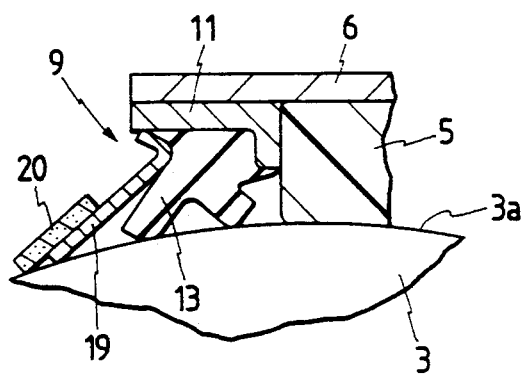
FIGS. 8 and 9 are enlarged fragmentary cross-sectional views of the sealing portions of sealing covers of other embodiments of the present invention.
Figure 9:
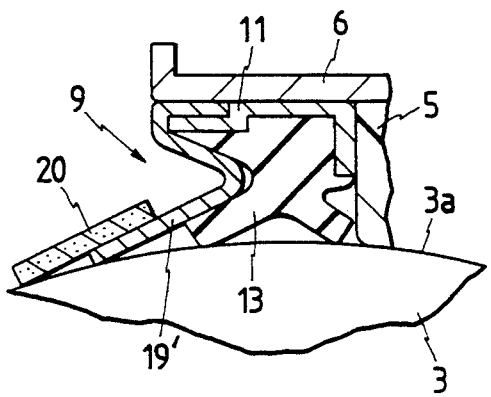

As shown in FIGS. 8 and 9, annular scrapers 19, 19' may be fitted on the fronts of the lips 13 and 14 so that extraneous substances and lubricant solidifications clinging to the outside spherical surface 3a of the outer member 3 are removed therefrom by the scraper. Filters 20 may be fitted on the fronts of the scrapers 19, 19' to collect minute extraneous substances. It is preferable that the scrapers 19, 19' are made of relatively soft brass or the like so that they will not scratch the outer member 3, and the filters 20 are made of a non-woven fabric of high collecting property. The scrapers 19, 19' also function to prevent the lips 13 and 14 from being opened due to the centrifugal force at the time of rotation thereof. The lip seals may be of such a type that they are directly fixed, such as by adhesive for example, to the outer portion 6 of the first spherical shell 4.

Figure 10:
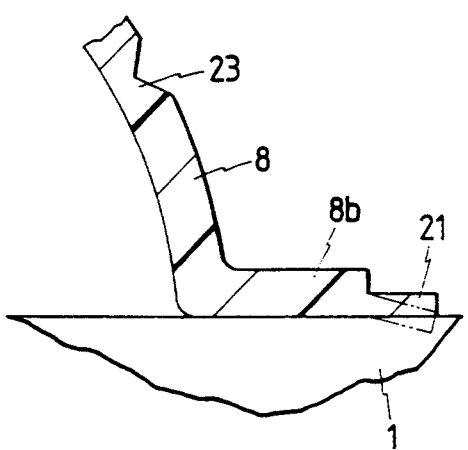
FIG. 10 is an enlarged fragmentary cross-sectional view of the fitted portion of the second spherical shell of a sealing cover of yet another embodiment of the present invention.

As shown in FIG. 10, a lip seal 21, which is a kind of a whisker seal, may be attached to the fitted end portion 8b of the second spherical shell 8 to enhance the sealing property of the portion.

As shown in FIGS. 1 and 5, a slinger 22 may be attached to the end of the outer portion 6 of the first spherical shell 4 so that muddy water gathering to the end is slung away to enhance the sealing property of the sealing cover.

As shown in FIG. 10, the second spherical shell 8 may be provided with one or more thin parts 23 near the end 8b of the shell so that the influence of eccentricity of the shafts 1 and 2 on the sealing cover is limited to secure the smoothness of the sliding action thereof. The smoothness can be secured in that the shell 8 fixed to the input shaft 1 is prevented from becoming eccentric to the outer member 3. If the shell 8 is provided with the thin parts 23, the portion of the shell, which is located nearer the outer member 3 than the thin parts, is less likely to become eccentric, thus securing the smoothness of the sliding action of the sealing cover.

Figure 11:
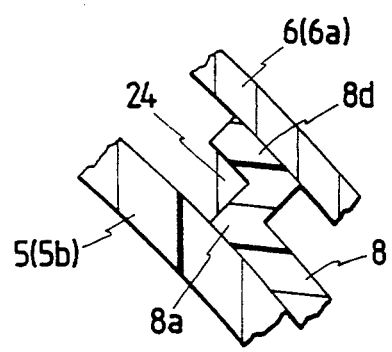
FIGS. 11 and 12 are enlarged fragmentary cross-sectional views of the sliding parts of sealing covers of still other embodiments of the present invention.

As shown in FIG. 11, the bent portion 8d of the second spherical shell 8 at the end 8a thereof may be provided with ribs 24 for reinforcing the bent portion to make the shell less likely to become eccentric, thus securing the smoothness of the sliding action of each of the sealing covers.

Figure 18:
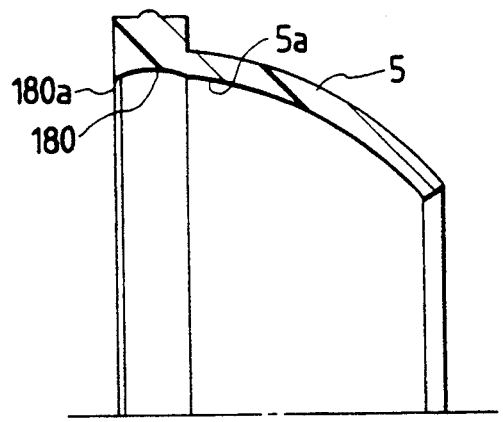
FIGS. 18, 19 and 20 are partial cross-sectional views of major parts of sealing covers of still further embodiments of the present invention.

FIG. 18 shows an inner portion of a sealing cover which is yet another embodiment. The difference of the sealing cover from those shown in other figures is that the inside spherical surface 5a of the inner sliding portion 5 has an annular groove 180 for absorbing the thermal expansion of the portion. The annular groove 180 is located so that the side edge of the groove at the largest diameter of the portion 5 is on the outside spherical surface 3a of the outer member 3.

Figure 19:
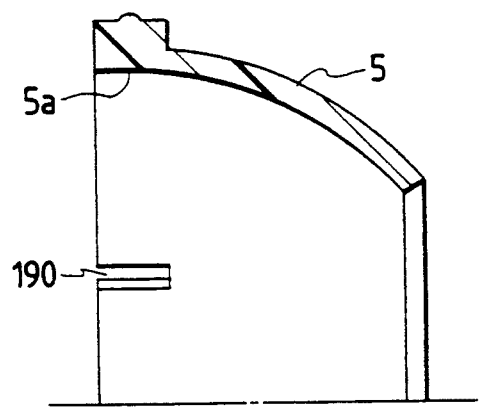

FIG. 19 shows yet another embodiment wherein the difference of the sealing cover from those shown in other figures is that the inner sliding portion 5 is provided with one or more notches 190 in mutually symmetric positions on the end of the portion at the largest diameter thereof so as to absorb the thermal expansion of the portion.

Figure 20:
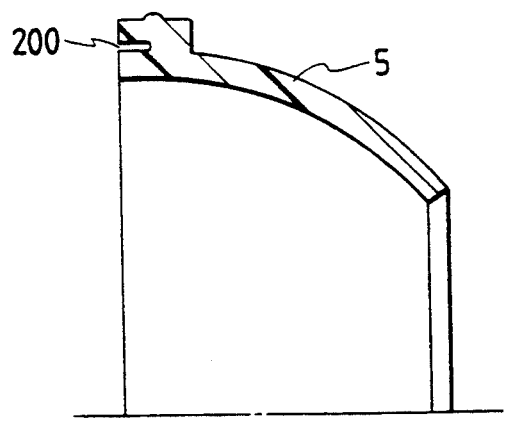

FIG. 20 shows yet another embodiment wherein the difference of the sealing cover from those shown in other figures is that the inner sliding portion 5 is provided with an annular slot 200 on the end of the portion at the largest diameter thereof so as to absorb the thermal expansion of the portion.

Figure 21:
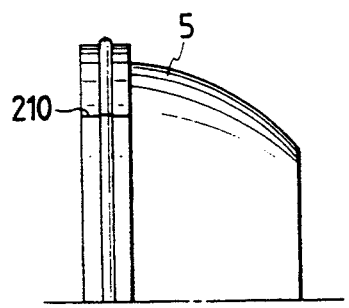
FIG. 21 is a partial side view of a major part of a sealing cover which is yet another embodiment of the present invention.
Figure 22:
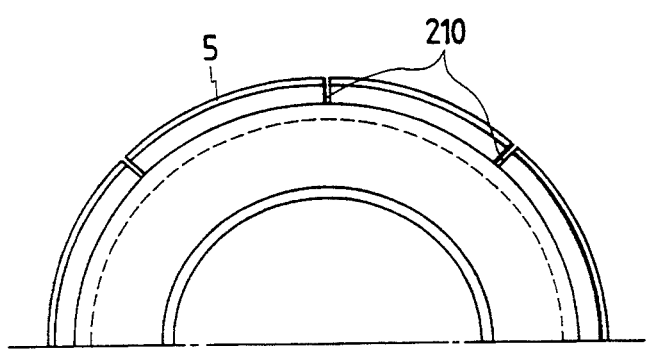
FIG. 22 is a partial front view of the major part shown in FIG. 21.

FIGS. 21 and 22 show yet another embodiment wherein the difference of the sealing cover from those shown in other figures is that the inner sliding portion 5 is provided with redial slots 210 in the peripheral surface of the portion so as to absorb the thermal expansion thereof.

The cross-sectional form, size, number and position of the grooves 180, notches 190 and slots 200 and 210 of the sealing covers shown in FIGS. 18, 19, 20, 21 and 22 are appropriately determined in consideration of the material and temperature of the inner sliding portion 5, the fitting load, sliding load and detaching load thereon.

Figure 23:
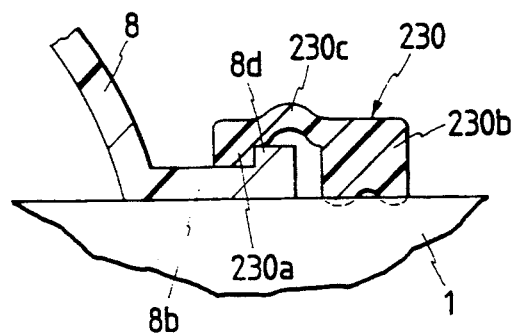
FIG. 23 is an enlarged fragmentary cross-sectional view of a major part of a sealing cover of a further embodiment of the present invention.

FIG. 23 shows a part of a sealing cover which is yet another of the embodiments. The difference of the sealing cover from those shown in other figures is that the end portion 8b of the second spherical shell 8 of the cover is slidably fitted on the input shaft 1 by a annular fitting member 230 made of a rubber-like elastic material. The fitting member 230 includes a portion 230a fitted on the end portion 8b of the shell 8, a portion 230b fitted on the input shaft 1, and a bellows-like portion 230c extending between the portions 230a and 230b so as to expand or contract to offset the influence of the clearance between the input and the output shafts 1 and 2 or of the play thereof. The end portion 8b of the shell 8 is provided with a projection 8d engaged with the portion 230a of the fitting member 230 on the facets of the portions, which extend perpendicularly to the axial direction of the sealing cover. The fitting member 230 also functions as a seal to prevent lubricant inside the sealing cover from leaking out and external dust from entering into the cover. The influence of the clearance between the input and the output shafts 1 and 2 or of the play thereof is thus offset by the expansion or contraction of the bellows-like portion 230c to prevent heating or wear so as to lengthen the life of the sealing cover.

We claim:

1. A sealing cover fitted on a coupling connecting an input shaft to an output shaft for universal joint type relative movement of the shafts with respect to each other, the coupling having an outer member with an outer part spherical surface and connected to one of the shafts, the sealing cover comprising:

a first part spherical shell comprising a radially outer portion made of metal, a radially inner portion made of synthetic resin having an inner part spherical surface slidably fitted on said outer part spherical surface of said outer member, and a substantially part spherically shaped channel open at one end of said first part spherical shell near the other of said shafts;

a second part spherical shell having an outer surface, one end slidably inserted in said channel, and fitted at the other end thereof on said other shaft;

a first sealing member fixedly attached on the other end of said first part spherical shell having a first lip portion of rubber material thereon in sealing engagement with said outer part spherical surface of said outer member;

a second sealing member fixedly attached on said one end of said first part spherical shell and having a second lip portion of rubber material thereon in sealing engagement with said outer surface of said second part spherical shell; and means for compensating for thermal expansion of said first part spherical shell, said compensating means comprising an annular groove on substantially the largest diameter portion of said inner part spherical surface of said radially inner portion of said first part spherical shell.

2. A sealing cover as claimed in claim 1, wherein:
said part spherical channel is located between said radially inner and outer portions;
said radially inner and outer portions, said first sealing member and said second sealing member are separately manufactured parts hermetically assembled with each other; and
said inner and outer portions are integrally secured together.

3. A sealing cover as claimed in claim 1, wherein:
said part spherical channel is located between said radially inner and outer portions.

4. A sealing cover as claimed in claim 1, wherein:
at least part of said inner part spherical surface of said radially inner portion and the outer surface of said radially inner portion in said channel are provided with a plurality of lubricant holding grooves extending substantially in the axial direction of said input shaft.

5. A sealing cover as claimed in claim 1, wherein:
a portion of said first part spherical shell is located radially inwardly of said part spherical channel in the radial direction of said cover, and has an annular end face adjacent said open end of said channel and diverging with respect to said other shaft substantially toward said channel from the radially inner side of said portion toward the radially outer side thereof.

6. A sealing cover as claimed in claim 1, wherein said second sealing member is disposed on said radially outer portion of said first part spherical shell.

7. A sealing cover as claimed in claim 1, wherein said first sealing member is integral with said radially inner portion.

8. A sealing cover as claimed in claim 1, wherein:
said first lip portion is inclined toward said output shaft, and said second lip portion is inclined toward said input shaft.

9. A sealing cover as claimed in claim 1 and further comprising:
an easily deformable annular thin part on said other end of said second part spherical shell engaging said other shaft.

10. A sealing cover as claimed in claim 1 and further comprising:
a radially outer wall on said channel; and
a sealing rib integrally formed on said one end of said second part spherical shell and slidably engaging said radially outer wall of said channel.

11. A sealing cover as claimed in claim 1 and further comprising:
a retaining member of elastic material on said other shaft for slidably retaining said other end of said second part spherical shell on said other shaft comprising a first portion fitted on said other end of said second part spherical shell, a second portion sealingly engaging said other shaft, and a bellows-like portion between said first and second portions of said retaining member for absorbing axial movement of said other shaft.

12. A sealing cover as claimed in claim 1, and further comprising:

at least one sliding member on said radially inner portion of said first part spherical shell and slidably engaging said second part spherical shell in said channel, said sliding member having lower frictional properties than said radially inner portion of said first part spherical shell.

13. A sealing cover as claimed in claim 1 and further comprising:
an outer part spherical surface on said radially inner portion of said first part spherical shell; and
axially extending grooves on said inner and outer surfaces of said radially inner portion of said first part spherical shell for holding lubricant.

14. A sealing cover as claimed in claim 1, and further comprising:
recess means on said radially inner portion for compensating for thermal expansion thereof.

15. A sealing cover as claimed in claim 1, wherein:
scrapers are provided adjacent outer sides of said lip portions in sliding contact with said outer surfaces of said outer member and said second part spherical shell, respectively.

16. A sealing cover as claimed in claim 15 and further comprising:
a filter made of non-woven fabric mounted on said scrapers and slidably engaging said outer part spherical surface of said outer member.

17. A sealing cover as claimed in claim 1, and further comprising:
recesses on said outer part spherical surface of said outer member for holding a lubricant.

18. A sealing cover as claimed in claim 17, wherein:
said recesses are formed by a roughened surface.

19. A sealing cover fitted on a coupling connecting an input shaft to an output shaft for universal joint type relative movement of the shafts with respect to each other, the coupling having an outer member with an outer part spherical surface and connected to one of the shafts, the sealing cover comprising:
a first part spherical shell comprising a radially outer portion, a radially inner portion having an inner part spherical surface thereon slidably fitted on said outer part spherical surface of said outer member, a substantially part spherically shaped channel located between respective parts of said radially inner and outer portions and open at one end of said first part spherical shell near the other of said shafts;
a second part spherical shell having an outer surface, one end slidably inserted into said channel, and fitted at the other end thereof on said other shaft;
a first sealing member adjacent the other end of said first part spherical shell having a first lip portion of rubber material thereon in sealing engagement with said outer part spherical surface of said outer member;
a second sealing member adjacent said one open end of said first part spherical shell having a second lip portion of rubber material thereon in sealing engagement with the outer surface of said second part spherical shell;
said radially inner and outer portions, said first sealing member and said second sealing member being separately manufactured parts hermetically assembled with each other;
a portion of said first part spherical shell being located radially outwardly of said part spherical channel and having a part expanded radially outwardly to increase the outer diameter of said channel;

an outer part spherical surface on said radially inner portion of said first part spherical shell; and a portion on said one end of said second part spherical shell slidably engaging on said outer part spherical surface of said radially inner portion of said first part spherical shell located radially inwardly of said channel.

20. A sealing cover fitted on a coupling connecting an input shaft to an output shaft for universal joint type relative movement of the shafts with respect to each other, the coupling having an outer member with an outer part spherical surface and connected to one of the shafts, the sealing cover comprising:

a first part spherical shell comprising a radially outer portion made of metal, a radially inner portion made of synthetic resin having an inner part spherical surface thereon slidably fitted on said outer part spherical surface of said outer member, and a substantially part spherically shaped channel open at one end of said first part spherical shell near the other of said shafts, and being located between respective parts of said radially inner and outer portions;

a second part spherical shell having an outer surface, one end slidably inserted into said channel, and fitted at the other end thereof on said other shaft;

a first sealing member adjacent the other end of said first part spherical shell having a first lip portion of rubber material thereon in sealing engagement with said outer part spherical surface of said outer member;

a second sealing member adjacent said one end of said first part spherical shell having a second lip portion of rubber material thereon in sealing engagement with the outer surface of said second part spherical shell; and a radially outwardly expanded portion on said radially outer portion for increasing the outer diameter of said channel.

* * * * *